(12) United States Patent
Misawa et al.

(10) Patent No.: US 7,889,985 B2
(45) Date of Patent: Feb. 15, 2011

(54) IMAGING APPARATUS

(75) Inventors: Atsushi Misawa, Asaka (JP); Koji Kobayashi, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1029 days.

(21) Appl. No.: 11/709,163

(22) Filed: Feb. 22, 2007

(65) Prior Publication Data

US 2007/0201851 A1  Aug. 30, 2007

(30) Foreign Application Priority Data

Feb. 27, 2006  (JP)  ............... 2006-051207

(51) Int. Cl.
  *G03B 3/10*  (2006.01)
  *G03B 13/34*  (2006.01)
(52) U.S. Cl. ............... 396/122; 396/123; 396/125; 348/345
(58) Field of Classification Search ......... 396/122, 396/125, 123; 348/345
See application file for complete search history.

(56) References Cited

U.S. PATENT DOCUMENTS

| | | | | |
|---|---|---|---|---|
| 5,315,339 A | * | 5/1994 | Hamada et al. | ............. 396/130 |
| 2003/0231291 A1 | * | 12/2003 | Kitajima et al. | ............... 355/56 |
| 2005/0270410 A1 | * | 12/2005 | Takayama | ................... 348/345 |
| 2007/0195190 A1 | * | 8/2007 | Sugimoto | ................... 348/345 |
| 2009/0278658 A1 | * | 11/2009 | Higashiyama | ............. 340/5.82 |

FOREIGN PATENT DOCUMENTS

| | | |
|---|---|---|
| JP | 10-229516 A | 8/1998 |
| JP | 2003-75717 A | 3/2003 |
| JP | 2004-20893 | 1/2004 |
| JP | 2004-77517 | 3/2004 |
| JP | 2004-320287 | 11/2004 |
| JP | 2005-283637 | 10/2005 |
| JP | 2006-18246 | 1/2006 |
| JP | 2006-227133 | 8/2006 |

* cited by examiner

*Primary Examiner*—Christopher Mahoney
(74) *Attorney, Agent, or Firm*—Birch Stewart Kolasch & Birch, LLP

(57) ABSTRACT

An imaging apparatus for forming an optical image of a subject on a light-receiving surface of an imaging element via a photographing lens; the imaging apparatus comprising:
  a first focusing position detection device which extracts a particular portion of the subject based on image signals obtained from the imaging element and detects the focusing position of the photographing lens based on the size of the extracted particular portion;
  a second focusing position detection device which calculates focus evaluation values of the subject based on image signals obtained from the imaging element and detects the focusing position of the photographing lens based on the calculated focus evaluation values; and
  a setting device which sets any one of the first focusing position detection device and the second focusing position detection device as a device which detects the focusing position of the photographing lens.

13 Claims, 8 Drawing Sheets

$$L = l\tan^{-1}\frac{\theta}{2}$$

IMAGING APPARATUS

BACKGROUND OF THE INVENTION

1. Field of the Invention

The present invention relates to an imaging apparatus, and in particular to an imaging apparatus which detects the focusing position of a photographing lens based on image signals obtained from an imaging element.

2. Description of the Related Art

In general, a digital camera is equipped with an auto focus (AF) system for automatically focusing a photographing lens. As the AF system of a digital camera, contrast AF for performing focusing with the use of output of an imaging element and outside light AF for measuring a distance with the use of an optical system different from a photographing lens are known.

In the contrast AF, a focus evaluation value indicating the sharpness of a subject image is calculated based on a high-frequency component in an image signal obtained from an imaging element, and a focus lens is moved to the position at which this focus evaluation value peaks.

Meanwhile, in the outside light AF, an infrared ray or an ultrasonic wave is emitted to a subject, the distance to the subject is calculated by applying the so-called principle of triangulation to a reflected wave from the subject, and a focus lens is moved to a focusing position corresponding to the obtained distance.

When the contrast AF and the outside light AF are compared with each other, the contrast AF excels in precision but has a problem that focusing takes time, and the outside light AF can quickly measure a distance but has a problem of being inferior in precision.

Accordingly, Japanese Patent Application Laid-Open No. 10-229516 proposes a digital camera which performs high-speed and high-precision AF by using both of the outside light AF and the contrast AF to switch them according to situations. For example, the high-speed and high-precision focusing according to situations is performed by usually performing focusing with the use of the high-speed outside light AF and performing focusing with the use of the contrast AF in the case of performing macro photographing. Furthermore, since the focusing precision of the outside light AF is degraded in a low or high temperature, the contrast AF is performed after the outside light AF in a low or high temperature, to perform the high-speed and high-precision focusing according to situations.

Furthermore, Japanese Patent Application Laid-Open No. 2003-75717 proposes a camera which extracts the face of a person from an image obtained from an imaging element and determines the distance to the subject based on the size of the face to perform focusing.

However, in the case of the camera with a system using both of the outside light AF and the contrast AF as that of Japanese Patent Application Laid-Open No. 10-229516, it is required to incorporate a distance measurement device for the outside light AF into the camera body, which is an disadvantage of increasing the cost.

Furthermore, there is also a problem that a photographer's intention of photographing is not exactly reflected because how the outside light AF and the contrast AF are used depends on the camera. That is, though a photographer wants to give priority to quickness over focusing precision when a good photo opportunity pops up and to focusing precision over quickness when he desires to carefully create a work, the camera of Japanese Patent Application Laid-Open No. 10-229516 cannot exactly respond to such a request by the photographer.

In the case of the camera which determines the distance to a subject based on the size of the face of a photographed person to perform focusing as that of Japanese Patent Application Laid-Open No. 2003-75717, it excels in quickness but has a disadvantage of being inferior in focusing precision.

SUMMARY OF THE INVENTION

The present invention has been made in consideration of such a situation, and its object is to provide an imaging apparatus capable of exactly reflecting a photographer's intention of photographing to focus a photographing lens according to situations.

In order to achieve the above object, a first aspect of the present invention provides an imaging apparatus for forming an optical image of a subject on a light-receiving surface of an imaging element via a photographing lens; the imaging apparatus comprising: a first focusing position detection device which extracts a particular portion of the subject based on image signals obtained from the imaging element and detects the focusing position of the photographing lens based on the size of the extracted particular portion; a second focusing position detection device which calculates focus evaluation values of the subject based on image signals obtained from the imaging element and detects the focusing position of the photographing lens based on the calculated focus evaluation values; and a setting device which sets any one of the first focusing position detection device and the second focusing position detection device as a device which detects the focusing position of the photographing lens.

According to the first aspect of the present invention, there are provided a first focusing position detection device which extracts a particular portion of the subject based on image signals obtained from the imaging element and detects the focusing position of the photographing lens based on the size (area, length, width and the like) of the extracted particular portion; a second focusing position detection device which calculates focus evaluation values of the subject based on image signals obtained from the imaging element and detects the focusing position of the photographing lens based on the calculated focus evaluation values; and the focusing position of the photographing lens is detected with the use of the focusing position detection device set by the setting device. Since the first focusing position detection device is excels in quickness and the second focusing position detection device excels in the focusing precision, focusing appropriate for the situation can be performed by using any of them as appropriate.

In order to achieve the above object, a second aspect of the present invention provides the imaging apparatus according to the first aspect, further comprising a two-stage-stroke-type release button having half-pressing and full-pressing stages; wherein the setting device sets the second focusing position detection device as a focusing position detection device of the photographing lens when the release button is half pressed and sets the first focusing position detection device as the focusing position detection device of the photographing lens when the release button is fully pressed directly.

According to the second aspect of the present invention, there is provided a two-stage-stroke-type release button having half-pressing and full-pressing stages; and the setting device sets the second focusing position detection device as the focusing position detection device of the photographing lens when the release button is half pressed. The setting device sets the first focusing position detection device as the focusing position detection device of the photographing lens when the release button is fully pressed directly. Thereby, it is possible to exactly reflect a photographer's intention of photographing to focus an imaging lens. That is, the focusing position is detected with the use of the second focusing position detection device superior in focusing precision when the release button is half pressed, and the focusing position is detected with the use of the first focusing position detection device superior in quickness when the release button is fully pressed directly. Thus, by using the half-pressing or the full-pressing of the release button appropriately, it is possible to exactly reflect a photographer's intention of photographing to focus the photographing lens.

In order to achieve the above object, a third aspect of the present invention provides the imaging apparatus according to the first aspect, further comprising a selection device which selects any one of a first focusing mode for detecting the focusing position of the photographing lens by the first focusing position detection device and a second focusing mode for detecting the focusing position of the photographing lens by the second focusing position detection device; wherein the setting device sets the first focusing position detection device as a focusing position detection device of the photographing lens when the first focusing mode is selected by the selection device and sets the second focusing position detection device as the focusing position detection device of the photographing lens when the second focusing mode is selected by the selection device.

According to the third aspect of the present invention, there is provided a selection device which selects any one of a first focusing mode for detecting the focusing position of the photographing lens by the first focusing position detection device and a second focusing mode for detecting the focusing position of the photographing lens by the second focusing position detection device; and the setting device sets the first focusing position detection device as the focusing position detection device of the photographing lens when the first focusing mode is selected by the selection device and sets the second focusing position detection device as the focusing position detection device of the photographing lens when the second focusing mode is selected by the selection device. That is, the focusing position detection device to be used can be arbitrarily switched based on a photographer's selection. Thereby, it is possible to exactly reflect the photographer's intention of photographing to focus the imaging lens.

To achieve the above object, a fourth aspect of the present invention provides the imaging apparatus according to the first aspect, further comprising a photographing condition detection device which detects a photographing condition; wherein the setting device sets any one of the first focusing position detection device and the second focusing position detection device as a focusing position detection device of the photographing lens according to the result of the setting by the photographing condition setting device.

According to the fourth aspect of the present invention, there is provided a photographing condition detection device which detects a photographing condition; and the setting device sets any one of the first focusing position detection device and the second focusing position detection device as the focusing position detection device of the photographing lens according to the result of the setting by the photographing condition setting device. Thereby, it is possible to automatically perform appropriate focusing according to the photographing situation.

In order to achieve the above object, a fifth aspect of the present invention provides the imaging apparatus according to the fourth aspect, wherein the photographing condition is the focal distance of the photographing lens; and the setting device sets the first focusing position detection device as the focusing position detection device of the photographing lens when the focal distance of the photographing lens is below a specified focal distance set in advance and sets the second focusing position detection device as the focusing position detection device of the photographing lens when the focal distance of the photographing lens is equal to or above the specified focal distance.

According to the fifth aspect of the present invention, the photographing condition is specified by the focal distance of the photographing lens; and the setting device sets the first focusing position detection device as the focusing position detection device of the photographing lens when the focal distance of is below a specified focal distance set in advance and sets the second focusing position detection device as the focusing position detection device of the photographing lens when the focal distance of the photographing lens is equal to or above the specified focal distance. That is, in the case of a wide angle area, since the depth of field is broad, quickness is given priority over focusing precision, and in the case of a telephoto area, since the depth of field is narrow, focusing is performed giving priority to focusing precision over quickness. Thereby, it is possible to automatically perform appropriate focusing according to the photographing situation.

To achieve the above object, a sixth aspect of the present invention provides the imaging apparatus according to the fourth aspect, wherein the photographing condition is recording image quality; and the setting device sets the first focusing position detection device as the focusing position detection device of the photographing lens when the recording image quality is below a specified image quality set in advance and sets the second focusing position detection device as the focusing position detection device of the photographing lens when the recording image quality is equal to or above the specified image quality.

According to the sixth aspect of the present invention, the photographing condition is specified by the recording image quality; and the setting device sets the first focusing position detection device as the focusing position detection device of the photographing lens when the recording image quality is below a specified image quality set in advance and sets the second focusing position detection device as the photographing lens focusing position detection device when the recording image quality is equal to or above the specified image quality. That is, quickness is given priority over focusing precision in the case of low image quality, and focusing precision is given priority over quickness in the case of high image quality. Thereby, it is possible to automatically perform appropriate focusing according to the photographing situation.

In order to achieve the above object, a seventh aspect of the present invention provides the imaging apparatus according to the fourth aspect, wherein the photographing condition is a motion picture recording mode or a still image recording mode; and the setting device sets the first focusing position detection device as the focusing position detection device of the photographing lens when the recording mode is the motion picture recording mode and sets the second focusing position detection device as the focusing position detection device of the photographing lens when the recording mode is the still image recording mode.

According to the seventh aspect of the present invention, the photographing condition is specified by a motion picture recording mode or a still image recording mode; and the setting device sets the first focusing position detection device as the focusing position detection device of the photographing lens when the recording mode is the motion picture recording mode and sets the second focusing position detection device as the focusing position detection device of the photographing lens when the recording mode is the still image recording mode. That is, in the case of taking a motion picture, quickness is given priority over focusing precision, and in the case of taking a still image, focusing is performed giving priority to focusing precision over quickness. Thereby, it is possible to automatically perform appropriate focusing according to the photographing situation.

In order to achieve the above object, an eighth aspect of the present invention provides the imaging apparatus according to any one of the first to seventh aspects, wherein the setting device switches to and sets the first focusing position detection device as the focusing position detection device of the photographing lens if it is not possible to detect the focusing position of the photographing lens by the second focusing position detection device.

According to the eighth aspect of the present invention, if the focusing position of the photographing lens cannot be detected by the second focusing position detection device, the focusing position detection device is switched to the first focusing position detection device to attempt detection of the focusing position of the photographing lens again. That is, detection of the focusing position based on focus evaluation values is not suitable for a subject with a low contrast, and therefore, in order to make it possible to photograph such a subject certainly, the focusing position detection device is switched to the first focusing position detection device to attempt detection of the focusing position of the photographing lens again if the focusing position of the photographing lens cannot be detected by the second focusing position detection device. Thereby, it is possible to prevent AF from being impossible and enable quick focusing.

In order to achieve the above object, a ninth aspect of the present invention provides the imaging apparatus according to any one of the first to seventh aspects, wherein the setting device switches to and sets the second focusing position detection device as the focusing position detection device of the photographing lens if it is not possible to detect the focusing position of the photographing lens by the first focusing position detection device.

According to the ninth aspect of the present invention, if the focusing position of the photographing lens cannot be detected by the first focusing position detection device, the focusing position detection device is switched to the second focusing position detection device to attempt detection of the focusing position of the photographing lens again. That is, the first focusing position detection device cannot perform focusing unless a particular portion of a subject can be detected, and therefore, in order to make it possible to perform photographing certainly even in such a case, the focusing position detection device is switched to the second focusing position detection device to attempt detection of the focusing position of the photographing lens again if the focusing position of the photographing lens cannot be detected by the first focusing position detection device. Thereby, it is possible prevent AF from being impossible and enable quick focusing.

In order to achieve the above object, a tenth aspect of the present invention provides the imaging apparatus according to any one of the first to ninth aspects, wherein the particular portion is the face or the eyes of a subject.

According to the tenth aspect of the present invention, the first focusing position detection device extracts the face or eyes of a subject based on image signals obtained from the imaging element and detects the focusing position of the photographing lens based on the size (area, length, width and the like) of the extracted face or eyes. Since the size of the face or eyes of any person is almost the same when taken as an image, the focusing position of the photographing lens can be detected based on the size of the face or eyes of a person.

According to the imaging apparatus according to the present invention, it is possible to exactly reflect a photographer's intention of photographing to focus a photographing lens according to situations.

DETAILED DESCRIPTION OF THE PREFERRED EMBODIMENTS

An embodiment for embodying an imaging apparatus according to the present invention will be described below with reference to accompanying drawings.

Figure 1:
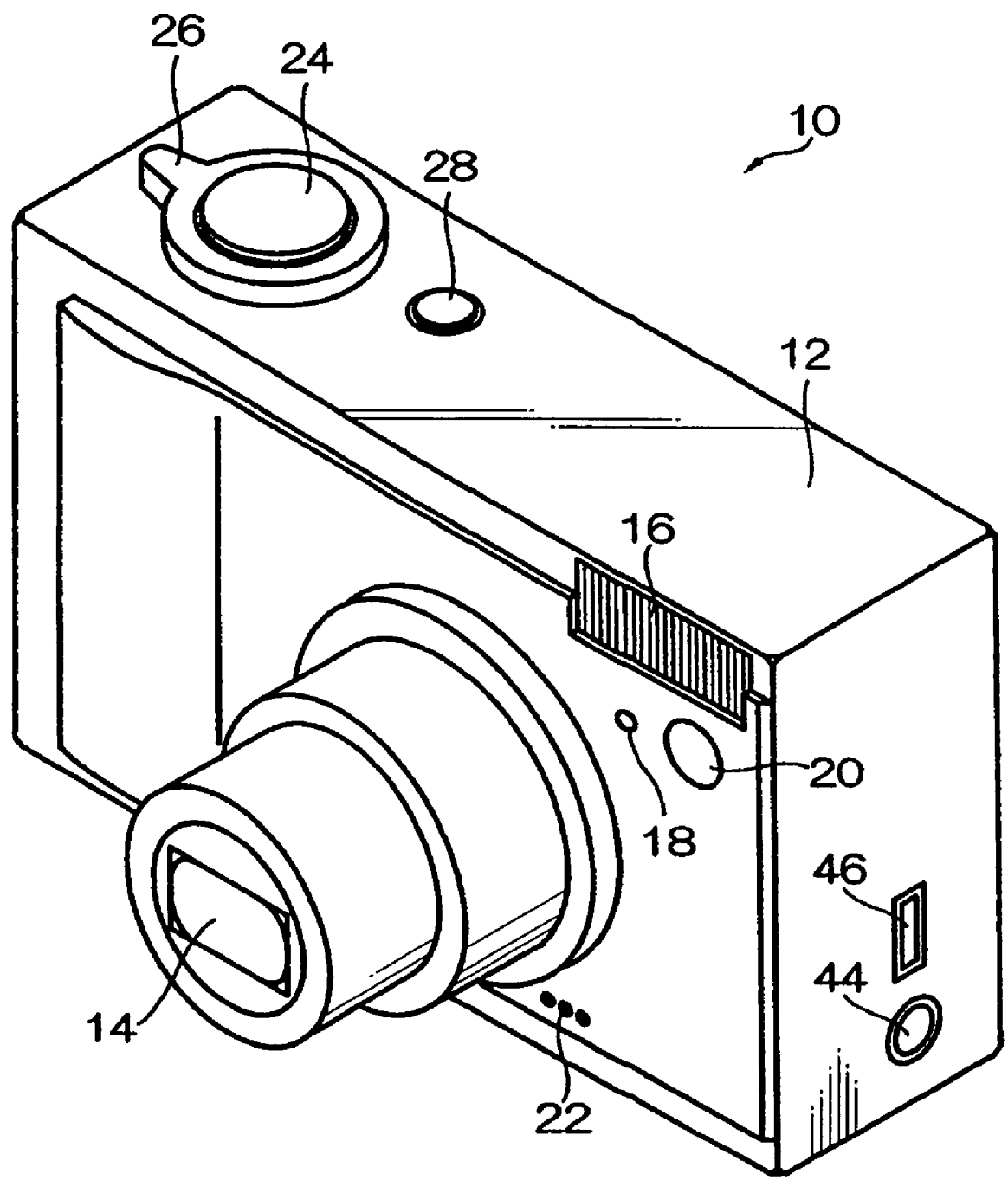
FIG. 1 is a front perspective view showing the appearance configuration of an imaging apparatus of this embodiment.
Figure 2:
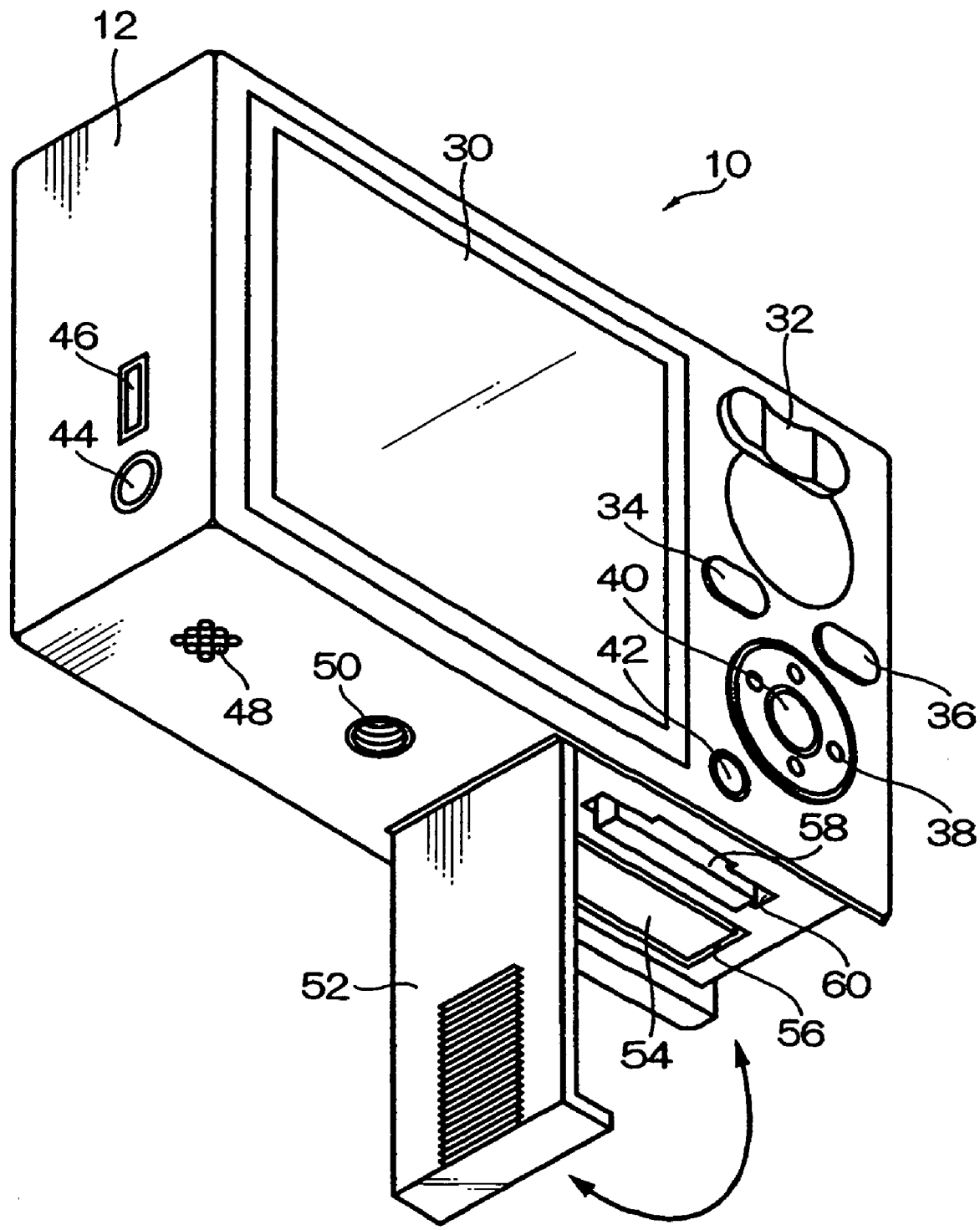
FIG. 2 is a back perspective view showing the appearance configuration of the imaging apparatus of this embodiment.

FIGS. 1 and 2 are the front perspective view and the back perspective view, respectively, showing an embodiment of the appearance configuration of the imaging apparatus according to the present invention.

As shown in the figure, this imaging apparatus 10 is a so-called compact-type digital camera, and an apparatus body 12 is thin and formed in a square box shape.

At the front of the apparatus body 12, there are provided a photographing lens 14, a flash unit 16, a self-timer lamp 18, an AF auxiliary light lamp 20, a microphone 22 and the like, and on the upper surface, there are provided a release button 24, a mode lever 26 and a power source button 28 and the like, as shown in FIG. 1.

At the back of the apparatus body 12, there are provided a monitor 30, a zoom button 32, a reproduction button 34, a function button 36, a cross button 38, a MENU/OK button 40, a DISP/BACK button 42 and the like, and on the side surface, there are provided a power source terminal 44, a USB terminal 46 and the like, as shown in FIG. 2.

At the bottom surface of the apparatus body 12, there are provided a speaker 48, a tripod hole 50 and a battery cover 52. The battery cover 52 is openably and closably provided, being swingably supported by the apparatus body 12 at one end thereof. Inside the battery cover 52, there are provided a battery chamber 56 for containing a battery 54 and a memory card slot 60 through which a memory card 58 is to be mounted.

The photographing lens 14 is configured by a collapsible mount type zoom lens, and it is moved forward from the apparatus body 12 when the power source of the imaging apparatus 10 is turned on. Since the zoom mechanism and the collapsible mount mechanism for the photographing lens 14 are well known techniques, specific description thereof will be omitted here.

The flash unit 16 is configured, for example, by a xenon tube, and it automatically or forcedly emits light as required when photographing is performed.

The self-timer lamp 18 is configured, for example, by an LED, and it emits light and blinks to notify the subject of the photographing timing when self-timer photographing is performed.

The AF auxiliary light lamp 20 is configured, for example, by a high-intensity LED, and it emits light to illuminate a subject when low-intensity photographing is performed.

The release button 24 is configured by a two-stage-stroke-type switch having so-called "half pressing" and "full pressing" stages. By this release button 24 being fully pressed, the imaging apparatus 10 executes recording processing of an image. However, different AF processing is performed in the case of performing full-pressing after half-pressing and in the case of directly performing full-pressing. This point will be described in detail later.

The mode lever 26 is used to set an operation mode of the imaging apparatus 10. This mode lever 26 is movably provided around the release button 24 in a manner that it can be set to a predetermined "SP position", "AUTO position", "M position" or "motion picture position". By setting this mode lever 26 to the "SP position", the imaging apparatus 10 is set to a "scene program photographing mode", which is a mode for performing exposure control according to photographing scenes prepared in advance. By setting the mode lever to the "AUTO position", the imaging apparatus 10 is set to an "auto-photographing mode", which is a mode for performing exposure control fully automatically. By setting the mode lever to the "M position", the imaging apparatus 10 is set to a "manual photographing mode", which is a mode for manually making exposure settings. By setting the mode lever to the "motion picture position", the imaging apparatus 10 is set to a "motion picture photographing mode", which is a mode for taking a motion picture.

It is assumed that, in the imaging apparatus 10 of this embodiment, there are prepared four modes, that is, a "person mode" for photographing a person, a "scenery mode" for photographing scenery, a "sports mode" for photographing sports and a "night view mode" for photographing a night view as the "scene program photographing mode", and that the mode to be used is set on a menu screen. That is, as one of menu items to be displayed on the menu screen, an item for setting the "scene program photographing mode" is prepared, and the mode which is set when the mode lever 26 is set to the "SP position" under this "scene program photographing mode" setting item is selected.

The power source button 28 functions as a button for instructing on/off of the power source, and the power source for the imaging apparatus 10 is turned on or off by pressing the button for a predetermined time (for example, two seconds).

The monitor 30 is configured by a color LCD. This monitor 30 is used as an image display section for displaying a photographed image, and it is also used as a GUI (graphical user interface) when various settings are made. When photographing is performed, through display of images captured by an imaging element is made thereon when photographing is performed so that the monitor is used as an electronic finder.

The zoom button 32 functions as a button for instructing zooming of the imaging lens 14 during the photographing mode, and it also functions as a button for instructing enlargement/reduction of an image during the reproduction mode.

The zoom button 32 is constituted by a zoom tele button for instructing zooming for telephotograph or enlargement and a zoom wide button for instructing zooming for wide angle or reduction.

The reproduction button 34 functions as a button for instructing switching to the reproduction mode. When this reproduction button 34 is pressed during the photographing mode, the imaging apparatus 10 is switched to the reproduction mode. If the reproduction button 34 is pressed for a predetermined time (for example, two seconds) while the power is off, the imaging apparatus 10 is activated in the reproduction mode.

The function button 36 functions as a button for instructing call of a setting screen for various photographing functions during the photographing mode, and it also functions as a button for instructing call of a setting screen for various reproduction functions during the reproduction mode. That is, if this function button 36 is pressed during the photographing mode, a setting screen for making settings, such as the image size (the number of recorded pixels) and sensitivity, is displayed on the monitor 30, and if this function button 36 is pressed during the reproduction mode, a setting screen for making settings for print reservation (DPOF) is displayed on the monitor 30.

The cross button 38 is provided in a manner that it can be pressed in four directions of upward, downward, leftward and rightward directions, and functions corresponding to the setting state of the camera are allocated to the buttons in the respective directions. That is, in the case of performing photographing, for example, a function of switching on/off of the macro mode is assigned to the left button, and a function of switching the flash unit mode is assigned to the right button. A function of changing brightness of the monitor 30 is assigned to the upper button, and a function of switching on/off of the self timer is assigned to the lower button. In the case of performing reproduction, a frame advancing function is assigned to the left button, and a frame returning function is assigned to the right button. A function of changing brightness of the monitor 30 is assigned to the upper button, and a function of deleting an image being reproduced is assigned to the lower button. In the case of making various settings, a function of moving a cursor displayed on the monitor 30 to each button direction is assigned.

The MENU/OK button 40 functions as a button for instructing call of the menu screen (a menu button), and it also functions as a button for instructing determination of selected content, execution of processing and the like (an OK button). The function assigned to the MENU/OK button 40 is switched according to the setting state of the imaging apparatus 10.

The DISP/BACK button 42 functions as a button for instructing switching of the content of display on the monitor 30 (a DISP button), and it also functions as a button for instructing cancellation and the like of an input operation (a BACK button). The function assigned to this DISP/BACK button 42 is switched according to the setting state of the imaging apparatus 10.

An AC adapter not shown is connected to the power source terminal 44, and the battery 54 included in the battery chamber 56 is charged by receiving power supply from this AC adapter connected to the power source terminal 44. If the battery 54 is not mounted, the imaging apparatus 10 operates by receiving power supply from this AC adapter connected to the power source terminal 44.

A USB cable not shown is connected to the USB terminal 46, and the imaging apparatus 10 can be connected to a personal computer or the like via this USB cable. When the imaging apparatus 10 is connected to a personal computer, the imaging apparatus 10 is recognized as an external storage device by the personal computer, and writing and reading of data by the personal computer to and from the memory card 58 mounted in the apparatus body 12 is enabled.

A secondary battery is used as the battery 54. The battery 54 is charged by receiving power supply from the AC adapter connected to the power source terminal 44 as described above. Though, a secondary battery is assumed to be used in this embodiment, a configuration using a primary battery is also possible. A configuration is also possible in which the imaging apparatus 10 operates by receiving power supply from the AC adapter.

As the memory card 58, a memory card including a flash memory, such as Compact Flash (registered trademark), SmartMedia (registered trademark), SD Card (registered trademark), Multimedia Card (registered trademark), Memory Stick (registered trademark) and xD Picture Card (registered trademark), is used, and it is attachably and detachably mounted in the memory card slot 60. In addition, a configuration is also possible in which a small-sized hard disk such as Microdrive (registered trademark) or a disk medium such as CD, DVD, MO and FD is used.

Figure 3:
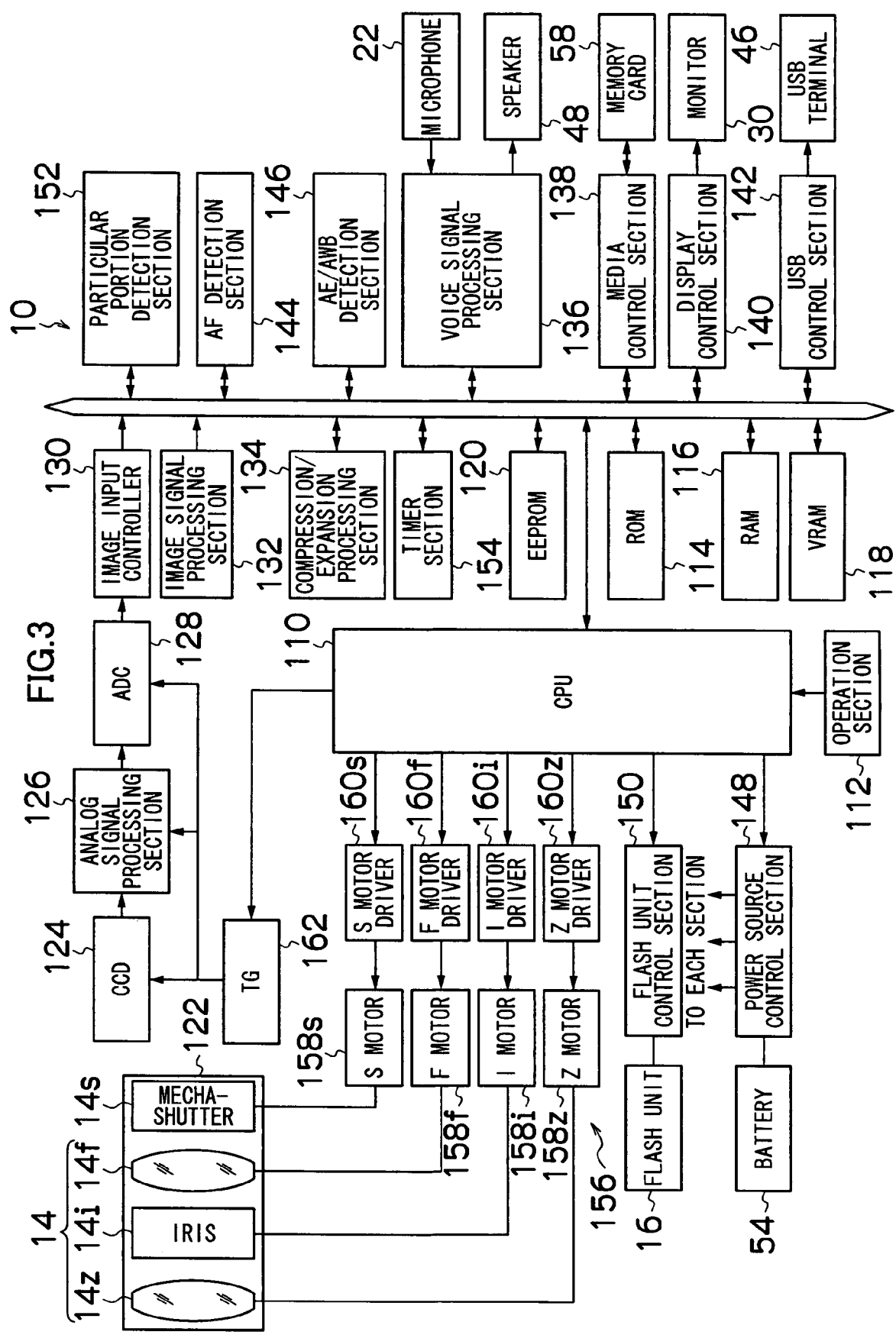
FIG. 3 is a block diagram showing the electrical configuration of the imaging apparatus of this embodiment.

FIG. 3 is a block diagram showing the electronic configuration of the imaging apparatus 10.

As shown in the figure, the imaging apparatus 10 is configured by a CPU 110, an operation section (the release button 24, the mode lever 26, the power source button 28, the zoom button 32, the reproduction button 34, the function button 36, the cross button 38, the MENU/OK button 40, the DISP/BACK button 42 and the like) 112, a ROM 114, a RAM 116, a VRAM 118, an EEPROM 120, a photographing optical system 122, an imaging element 124, an analog signal processing section 126, an A/D converter 128, an image input controller 130, an image signal processing section 132, a compression/expansion processing section 134, a voice signal processing section 136, a media control section 138, a display control section 140, a USB control section 142, an AF detection section 144, an AE/AWB detection section 146, a power source control section 148, a flash unit control section 150, a particular portion detection section 152, a timer section 154, a photographing optical system driving section 156 and the like.

The CPU 110 functions as a control device which performs overall control of the entire operation of the imaging apparatus 10, and it also functions as an operation processing device which performs various operation processings. It controls each section in accordance with a predetermined control program based on an input from the operation section 112.

In the ROM 114, control programs to be executed by the CPU 110 and various data required for control are stored. In the EEPROM 120, user setting data and the like are stored.

The RAM 116 is used as a work area for the CPU 110, and it is also used as a temporary storage area for image files. The VRAM 118 is used as a temporary storage area exclusively for image files to be displayed on the monitor 30.

The photographing optical system 122 includes the photographing lens 14, an iris 14*i* and a mecha-shutter 14*s*, and the photographing lens 14 includes a focus lens 14*f* for performing focusing and a zoom lens 14*z* for changing the focal distance.

The photographing optical system driving section 156 is provided with a focus motor 158*f* for driving the focus lens 14*f*, a zoom motor 158*z* for driving the zoom lens 14*z*, an iris motor 158*i* for driving the iris 14*i* and a shutter motor 158*s* for driving the mecha-shutter 14*s*. By controlling driving by the focus motor 158*f* via a focus motor driver 160*f*, the CPU 110 controls movement of the focus lens 14*f* to perform focusing of the photographing lens 14. Furthermore, by controlling driving by the zoom motor 158*z* via a zoom motor driver 160*z*, the CPU 110 controls movement of the zoom lens 14*z* to change the focal distance of the photographing lens 14. Furthermore, by controlling driving by the iris motor 158*i* via an iris motor driver 160*i*, the CPU 110 controls the amount of opening of the iris 14*i* to control the amount of light incident to the imaging element 124. Furthermore, by controlling driving by the shutter motor 158*s* via a shutter motor driver 160*s*, the CPU 110 controls exposure/interception of subject light onto the imaging element 124.

The imaging element 124 is configured, for example, by a color CCD with a predetermined color filter array, and a lot of photodiodes (light-receiving elements) are regularly arrayed on its light-receiving surface. The light which has entered the light-receiving surface of the imaging element 124 via the photographing optical system 122 is converted to a signal charge corresponding to the amount of the incident light by each photodiode and accumulated in each photodiode. The signal charges accumulated in each photodiode are sequentially read from each photodiode in accordance with a timing signal outputted from a timing generator 162 and outputted from the imaging element 124 as a voltage signal (image signal) with an amplitude corresponding to the amount of the charge.

The analog signal processing section 126 performs correlated double sampling processing of the image signals sequentially outputted from the imaging element 124, and amplifies and outputs them.

The A/D converter 128 converts R, G and B analog image signals outputted from the analog signal processing section 126 to digital image signals.

The image input controller 130 includes a line buffer with a predetermined capacity, accumulates image signals corresponding to one image which have been outputted from the A/D converter 128 and stores them in the RAM 116.

The image signal processing section 132 includes a synchronization circuit (a processing circuit for interpolating spatial displacement of color signals accompanying the color filter array of a single-panel CCD to synchronously converting the color signals), a white balance correction circuit, a gamma correction circuit, an outline correction circuit, a brightness/color difference signal generation circuit and the like, and it performs required signal processing of an inputted image signal to generate an image file (YUV data) constituted by brightness data (Y data) and color difference data (Cr/Cb data).

The compression/expansion processing section 134 performs predetermined compression processing for an inputted image file in accordance with a direction from the CPU 110 to generate a compressed image file of a predetermined format (for example, JPEG). Furthermore, it performs predetermined expansion processing for a compressed image file which has been inputted to generate an uncompressed image file.

The voice signal processing section 136 performs predetermined signal processing for inputted voice data in accordance with a direction from the CPU 110 and outputs it from the speaker 48. Furthermore, it performs predetermined signal processing for voice signal acquired from the microphone 22 to generate voice data.

The media control section 138 writes and reads data to and from the memory card 58 mounted in the memory card slot 60 in accordance with a direction from the CPU 110.

The display control section 140 includes an LCD drive circuit, an OSD (on-screen display) circuit and the like, and it generates a picture signal to be outputted to the monitor 30 in accordance with a direction from the CPU 110.

The USB control section 142 sends and receives data to and from external equipment such as a personal computer which is USB-connected via the USB terminal 46 in accordance with a direction from the CPU 110.

The AF detection section 144 calculates a focus evaluation value from an inputted image signal in accordance with a direction from the CPU 110. This AF detection section 144 is constituted by a high-pass filter which causes only a high-frequency component of an inputted image signal to pass, an absolute-valuing processing section, an AF area extraction section which cuts out a signal within a predetermined focus area (for example, the central part of the screen), an integration section which integrates absolute value data within the AF area and the like, and it notifies a value integrated by the integration to the CPU 110 as a focus evaluation value.

As described later, the CPU 110 moves the focus lens 14$f$ from the minimum object distance side to the infinity side within a predetermined movement range (search range) when the precision priority AF is performed, and acquires a focus evaluation value from the AF detection section 144 at a predetermined interval during the movement process of the focus lens 14$f$. Then, it detects a position at which the focus evaluation value peaks and sets it as a focusing position and moves the focus lens 14$f$ to the position (so-called contrast AF).

The AE/AWB detection section 146 calculates a physical quantity required for AE/AWB control in accordance with a direction from the CPU 110.

For example, image signals corresponding to one screen are divided into multiple areas (for example, 16×16) and calculates the integrated values of R, G and B image signals for each divided area, as the physical quantity required for AE/AWB control. The CPU 110 detects the brightness of a subject (subject brightness) based on the integrated values obtained from the AE/AWB detection section 146 and determines exposure (an iris value, shutter speed and sensitivity) from a predetermined program chart.

Furthermore, the CPU 110 determines the ratios of R/G and B/G for each divided area based on the integrated value of R, the integrated value of B and the integrated value of G obtained from the AE/AWB detection section 146 and makes determination of the kind of the light source based on the distribution of the determined R/G and B/G values in the R/G and B/G color spaces. Then, in accordance with a white balance adjustment value suitable for the determined kind of the light source, gain values (white balance correction values) for the R, G and B signals in the white balance adjustment circuit are determined so that the value of each ratio is to be, for example, approximately 1 (that is, the integration ratio of the RGB in one screen is to be R:G:B≈1:1:1).

The power source control section 148 includes a DC/DC converter, a charging circuit and the like, and it controls power supply to each section of the imaging apparatus from the battery 54 in accordance with a direction from the CPU 110. It also controls charging to the battery 54.

The flash unit control section 150 controls light emission of the flash unit 16 in accordance with a direction from the CPU 110.

The particular portion detection section 152 analyzes inputted image data to detect the face of a person and detects the position of the eyes from the detected face in accordance with a direction from the CPU 110 (extracts a face area from the image data, extracts an eyes area from the extracted face area and detects the position thereof (the center-of-gravity coordinates)). Since the method for detecting the face and eyes of a person from an image is a well-known technique, specific description thereof will be omitted.

Figure 4:
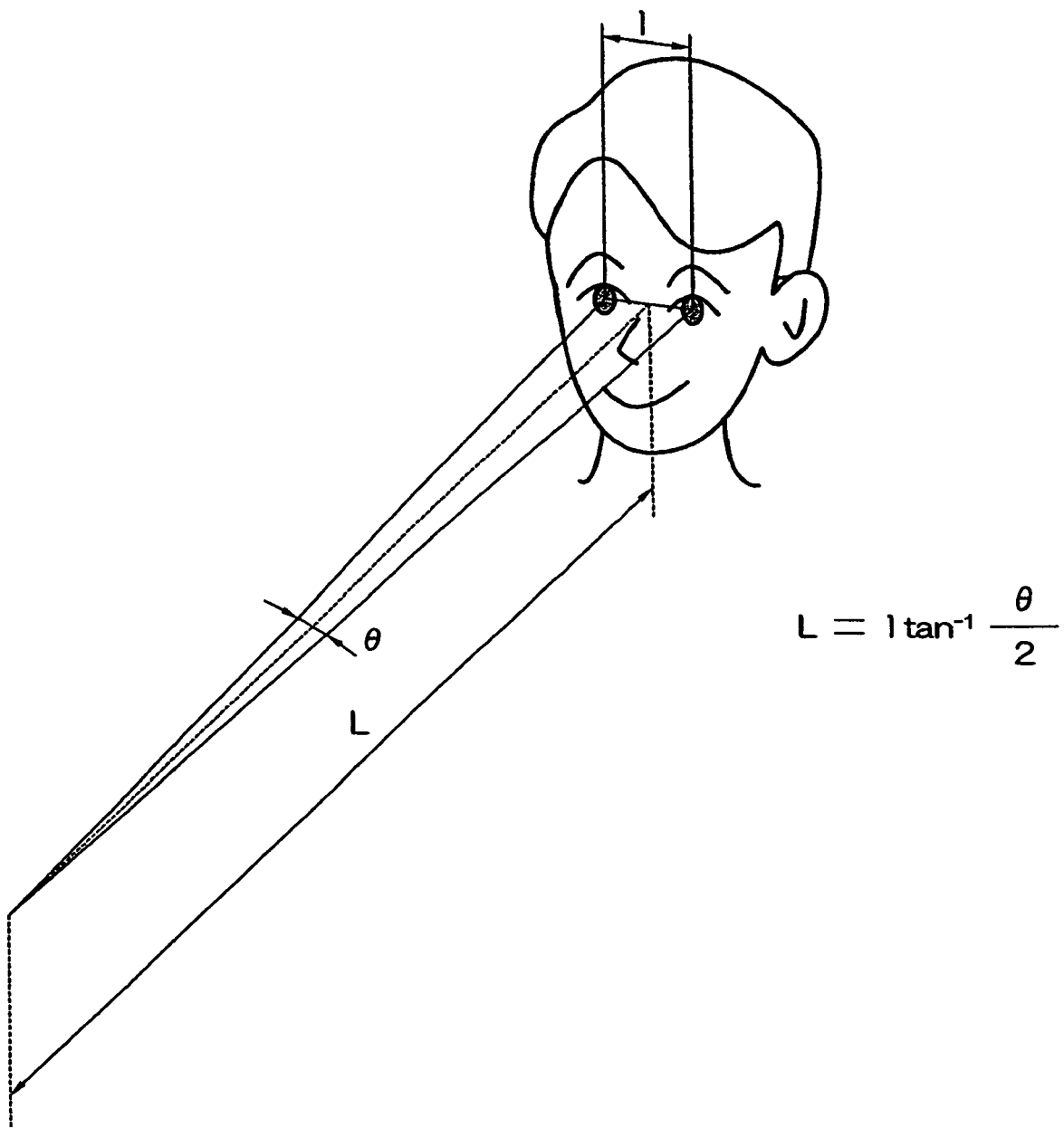
FIG. 4 is a diagram illustrating a method for calculating the subject distance.

The CPU 110 calculates the distance to the subject (subject distance) based on the information about the position of both eyes detected by the particular portion detection section 152 and information about the focal distance of the photographing lens 14. That is, for example, as shown in FIG. 4, if the width between both eyes is assumed to be 1, then L×tan(θ/2)=1 can be said about the subject distance L, and therefore, the subject distance L can be determined from L=1×tan$^{-1}$(θ/2).

In the case of the performing the quickness priority AF, the focusing position of the focus lens 14$f$ is set so that the focus is set on the subject positioned at this calculated subject distance L, and the focus lens 14$f$ is moved to the set focusing position to perform focusing.

The timer section 154 performs measurement of the current time and date and measurement of various times in accordance with a direction from the CPU 110.

Next, the operation of the imaging apparatus 10 of this embodiment will be described.

The imaging apparatus 10 executes image recording processing after making predetermined preparation for photographing in response to operation of the release button 24. That is, the image recording processing is executed after performing each of the auto exposure (AE), auto white balance (AWB) and AF processings.

As described above according to the imaging apparatus 10 of this embodiment, different AF processing is performed in the case of the release button 24 being half pressed and in the case of the release button 24 being fully pressed directly.

That is, in the case of the release button 24 being half pressed, the precision priority AF is selected, and the focusing position is detected based on focus evaluation values. In the case of the release button 24 being fully pressed directly, the quickness priority AF is selected, and the focusing position is detected based on the width between both eyes of a photographed subject.

Here, in the case of the quickness priority AF, the eyes of a subject are detected by the particular portion detection section 152 from image data obtained from the imaging element 124 when the release button 24 is fully pressed, and the subject distance is calculated based on the width between the detected eyes and the focal distance of the photographing lens 14. Then, the focusing position is determined based on the calculated subject distance, and the focus lens 14$f$ is moved to that position.

Meanwhile, in the case of the precision priority AF, the focus lens 14$f$ is moved from the minimum object distance side to the infinity side within a preset search range, and the focus evaluation values are sequentially calculated by the AF detection section 144. Then, a position at which the focus evaluation value peaks is set as the focusing position, and the focus lens 14$f$ is moved to that position.

There may be a case where multiple positions at which the focus evaluation value peaks are detected depending the photographing situation. In this case, the focusing position is determined by the following method. That is, if the face of a person is included in an image, the subject distance is calculated from the width between the eyes of the person, and a peak position corresponding to the face of the person is set as the focusing position based on the calculated subject distance. On the other hand, if the face of a person is not included in an image, a peak position on the minimum object distance side is set as the focusing position.

Figure 5:
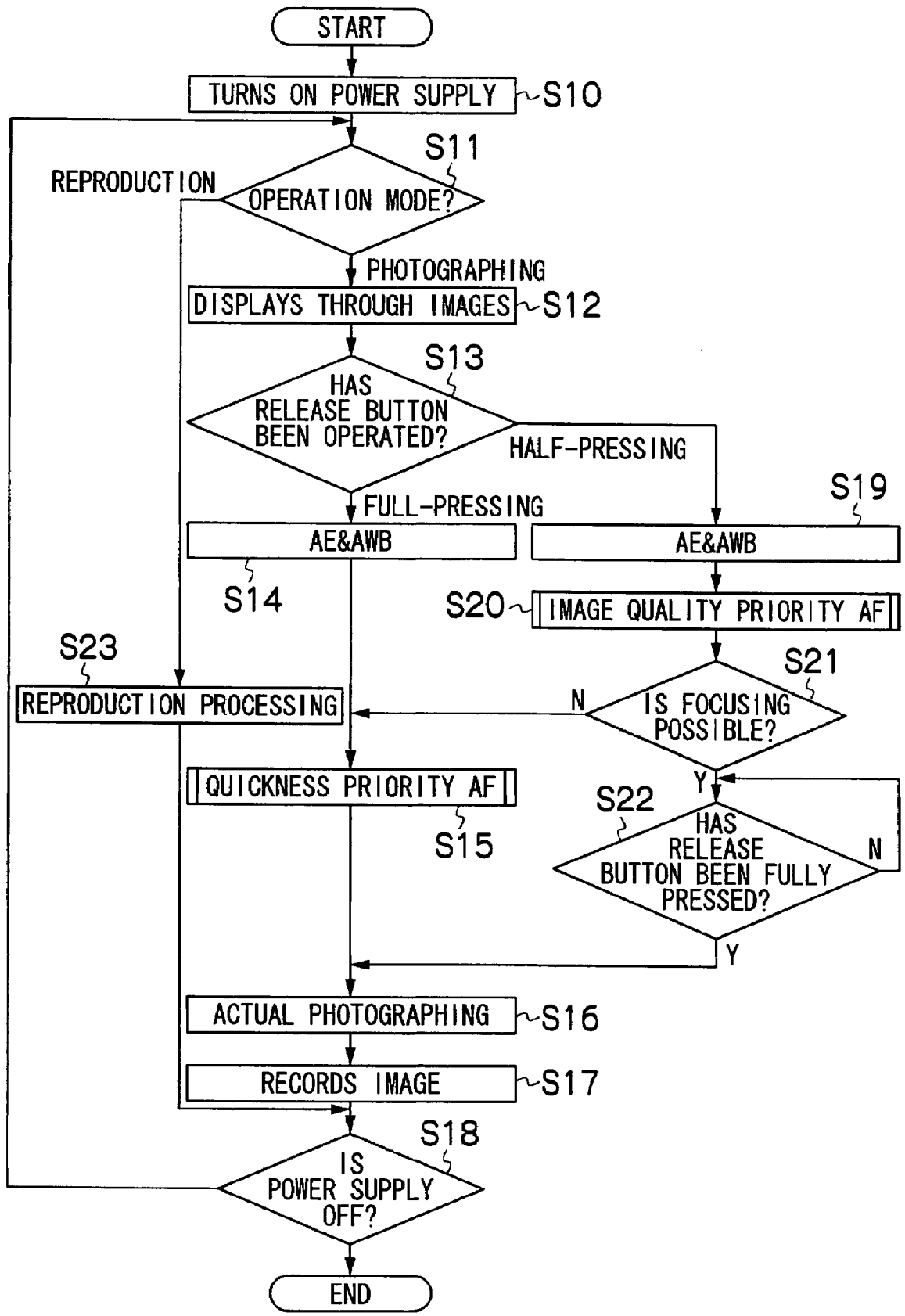
FIG. 5 is a flowchart showing the photographing procedure in the imaging apparatus of this embodiment.

FIG. 5 is a flowchart showing the photographing procedure in the imaging apparatus 10 of this embodiment.

First, when the power source is turned on (step S10), the CPU 110 determines the set operation mode. That is, it is determined whether the mode is set to the photographing mode or the reproduction mode (step S11).

Here, if it is determined that the mode is set to the photographing mode, then the CPU 110 starts through image display processing (step S12). The through image display processing is performed as follows. That is, images are continuously taken by the imaging element 124, and image data are sequentially generated from obtained image signals and sequentially stored in the VRAM 118. Then, the image data stored in the VRAM 118 are sequentially added to the display control section 140, converted to a signal format for monitor display and outputted to the monitor 30. Thereby, through-display of the images caught by the imaging element 124 on the monitor 30 is performed.

After that, the CPU 110 determines operation of the release button 24 based on an output from the release button 24 (step S13). That is, it is determined whether the release button 24 has been "half pressed" or "fully pressed".

If the release button 24 is half pressed, an S1ON signal is outputted to the CPU 110. If it is fully pressed, an S2ON signal is outputted to the CPU 110. The CPU 110 determines whether the release button 24 has been "half pressed" or "fully pressed" based on output of a signal from the release button 24.

Here, if it is determined that the release button 24 has been "fully pressed", then the CPU 110 first performs AE/AWB processings (step S14). That is, an image for AE/AWB is taken by the imaging element 124; a physical quantity required for AE/AWB control is obtained by adding the obtained image data to the AE/AWB detection section 146; and an iris value, shutter speed and a white balance correction value for actual photographing are determined.

After that, the CPU 110 executes the quickness priority AF processing (step S15).

Figure 6:
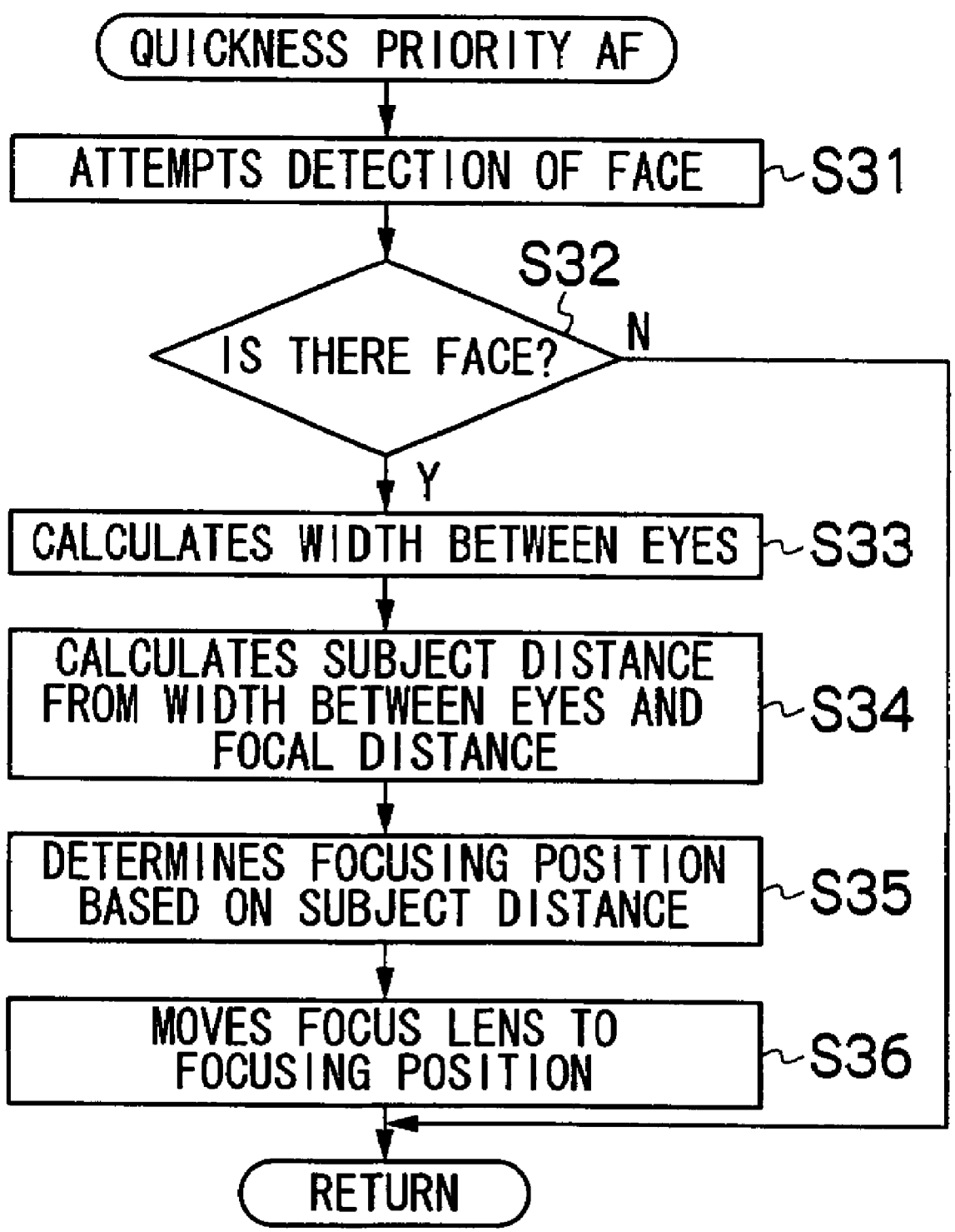
FIG. 6 is a flowchart showing the procedure for quickness priority AF processing.

FIG. 6 is a flowchart showing the procedure for the quickness priority AF processing.

First, detection of the face of a person from the image data for AE/AWB is attempted (step S31). That is, the image data for AE/AWB is added to the particular portion detection section 152 to attempt detection of a face. Then, based on the result of the detection attempt, it is determined whether or not the face of a person exists (step S32).

If it is determined that the face of a person exists as a result of the determination, then the CPU 110 calculates the width between the eyes of the subject based on position information about the eyes detected by the particular portion detection section 152 (step S33).

Then, the subject distance is calculated based on the calculated width between the eyes and the focal distance of the photographing lens 14 (step S34), and the focusing position of the focus lens 14f is determined based on the calculated subject distance (step S35).

After the focusing position is determined as described above, the CPU 110 drives a focus motor 120f via the focus motor driver 160f and moves the focus lens 14f to the determined focusing position (step S36). Thereby, the photographing lens 14 is focused on the face of the subject.

If it is determined at the above step S32 that there is not a face image, then the CPU 110 ends the processing. In this case, the CPU 110 sets a predetermined position (for example, a position at which pan focus is realized) as the focusing position and moves the focus lens 14f to this position.

After that, the CPU 110 executes this photographing processing as shown in FIG. 5 (step S16). That is, the imaging element 124 is exposed with the iris value and the shutter speed determined by the above AE processing to acquire an image signal for recording. In this case, the CPU 110 causes the flash unit 16 to emit light as necessary.

The image signals corresponding to one frame, which have been outputted from the imaging element 124 are once stored in the RAM 116 via the analog signal processing section 126, the A/D converter 128 and the image input controller 130 and inputted to the image signal processing section 132 from the RAM 116. The image signal processing section 132 generates image data (YUV data) from the inputted image signals.

The image file generated by the image signal processing section 132 is once stored in the RAM 114 and then added to the compression/expansion processing section 134. The compression/expansion processing section 134 performs predetermined compression processing for the inputted image file to generate a compressed image file.

The compressed image file generated by the compression/expansion processing section 134 is stored in the RAM 116, and the CPU 110 generates an image file of a predetermined format (for example, Exif), to which predetermined photographing information is added, for this compressed image file stored in the RAM 116 and records it to the memory card 58 via the media control section 138 (step S17).

After that, the CPU 110 determines whether or not the power source has been turned off based on an output from the power source button 28 and, if determining that the power source has been turned off, ends the processing.

On the other hand, if it is determined that the power source has not been turned off, then the flow returns to step S11 and executes the above processing again.

As described above, when the release button 24 is fully pressed directly, focusing is quickly performed by performing the quickness priority AF to execute photographing.

In comparison, when the release button 24 is half pressed, focusing is performed at a high precision by performing the precision priority AF to execute photographing, as described below.

If it is determined at the above step 13 that the release button 24 has been half pressed, then the CPU 110 first performs AE/AWB processing (step S19). That is, an image for AE/AWB is taken by the imaging element 124; the obtained image data is added to the AE/AWB detection section 146 to obtain a physical quantity required for AE/AWB control; and the iris value, the shutter speed and the white balance correction value for actual photographing are determined.

After that, the CPU 110 executes the precision priority AF processing (step S20).

Figure 7:
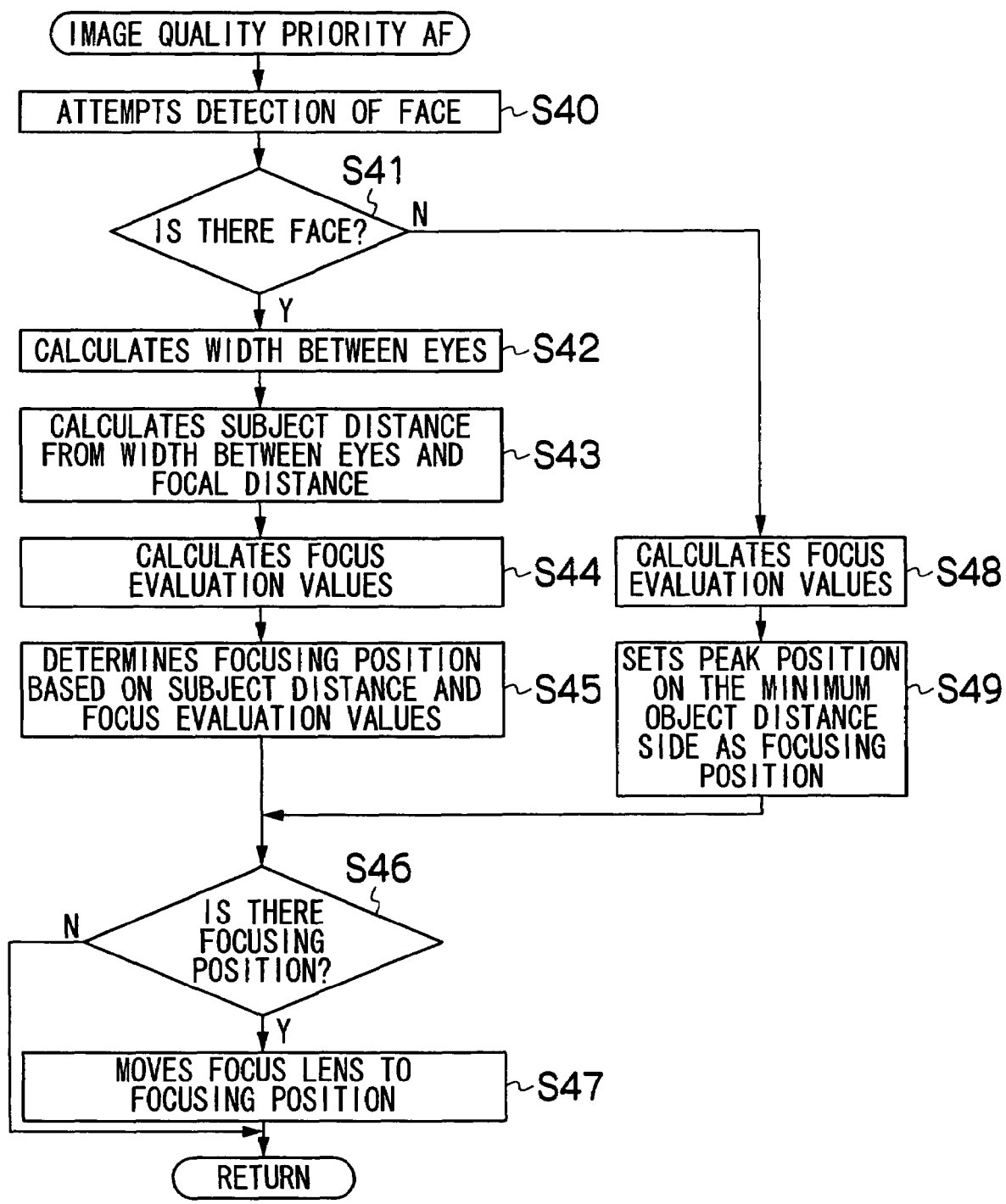
FIG. 7 is a flowchart showing the procedure for precision priority AF processing.

FIG. 7 is a flowchart showing the procedure for the precision priority AF processing.

First, the CPU 110 attempts to detect the face of a person from the image data for AE/AWB (step S40). Then, based on the result of the detection attempt, it is determined whether or not the face of a person exists (step S41).

If it is determined that the face of a person exists as a result of the determination, then the CPU 110 calculates the width between the eyes of the subject based on position information about the eyes detected by the particular portion detection section 152 (step S42). Then, the subject distance is calculated based on the calculated width between the eyes and the focal distance of the photographing lens 14 (step S43).

After that, the CPU 110 moves the focus lens 14f from the minimum object distance side to the infinity side within a predetermined search range and sequentially calculates focus evaluation values by the AF detection section 144 (step S44). Then, based on information about the calculated focus evaluation values and information about the subject distance, a peak position corresponding to the face of the person is set as the focusing position (step S45).

After that, the CPU 110 determines whether or not the focusing position has been set (whether or not the peak position has been detected) (step S46). If it is determined that the focusing position has been set, then the CPU 110 drives the focus motor 120f via the focus motor driver 160f and moves the focus lens 14f to the determined focusing position (step S47). Thereby, the photographing lens 14 is focused on the face of the subject.

On the other hand, if it is determined at the above step S42 that the face of a person does not exist, then the CPU 110 moves the focus lens 14f from the minimum object distance side to the infinity side within a predetermined search range and sequentially calculates focus evaluation values by the AF detection section 144 (step S48). Then, a peak position on the minimum object distance side is detected based on information about the calculated focus evaluation values, and the peak position is set as the focusing position (step S49).

After that, the CPU 110 determines whether or not the focusing position has been set (whether or not the peak position has been detected) (step S46). If it is determined that the position has been set, then the CPU 110 drives the focus motor 120f via the focus motor driver 160f and moves the focus lens 14f to the determined focusing position (step S47). Thereby, the photographing lens 14 is focused on the face of the subject.

After that, as shown in FIG. 5, the CPU 110 determines whether or not focusing has been successfully performed as a result of the performing precision priority AF (step S21). If it is determined that focusing has been successfully performed, then it is determined whether or not the release button 24 has been fully pressed (step S22). If it is determined that the release button 24 has been fully pressed, then actual photographing is executed (step S16), and an obtained image is recorded to the memory card 58 (step S17).

After that, the CPU 110 determines whether or not the power source has been turned off based on an output from the power source button 28. If it is determined that the power source has been turned off, then the processing is ended.

On the other hand, if it is determined that the power source has not been turned off, then the flow returns to step S11 and executes the above processing again.

If it is determined at the above step 21 that focusing by the precision priority AF was not successfully performed, then the CPU 110 executes the quickness priority AF processing (step S15) and executes the actual photographing (step S16) and the image recording processing (step S17).

In this way, when the release button 24 is half pressed, the precision priority AF is executed to perform focusing, and photographing is executed. If focusing has not been successfully performed with the precision priority AF, then the quickness priority AF is executed to perform focusing, and photographing is executed. Thereby, even in the case of photographing a subject with a low contrast for which the contrast AF is generally not suitable, it is possible to appropriately perform focusing to perform photographing.

If it is determined at step S11 that the operation mode is set to the reproduction mode, then the CPU 110 executes reproduction processing of a photographed image (step S23).

First, the CPU 110 reads a compressed image file of the latest image file which was recorded to the memory card 58 last via the media control section 138. The compressed image file which has been read is added to the compression/expansion processing section 134 to be an uncompressed image file, and after that, it is stored in the VRAM 118. Then, this image file stored in the VRAM 118 is added to the display control section 140, converted to a signal format for monitor display and outputted to the monitor 30. Thereby, the image recorded in the memory card 58 is reproduced and displayed on the monitor 30.

Image frame advancing is performed by operating the right and left buttons of the cross button 38. When the right button is operated, the next image is read from the memory card 58, and reproduced and displayed on the monitor 30. When the left button of the cross button 38 is operated, then the immediately previous image is read from the memory card 58, and reproduced and displayed on the monitor 30.

As described above, according to the imaging apparatus 10 of this embodiment, focusing is performed by appropriately switching the quickness priority AF and the precision priority AF depending on how the release button 24 has been pressed, and thereby, it is possible to perform photographing on which a photographer's intention of photographing is exactly reflected.

That is, in the case of desiring to give priority to quickness over precision to perform photographing, focusing is performed with the quickness priority AF superior in quickness by fully pressing the release button 24, and it is possible to quickly and appropriately perform focusing to perform photographing without missing a good photo opportunity.

On the other hand, in the case of desiring to carefully create a work, focusing is performed with the precision priority AF superior in precision by fully pressing the release button 24 after half pressing it, and it is possible to perform focusing with a high precision to perform photographing.

As described above, according to the imaging apparatus 10 of this embodiment, it is possible to exactly reflect a photographer's intention of photographing to perform photographing, and it is also possible to quickly and appropriately perform focusing.

Though, in this embodiment, focusing is performed with the quickness priority AF in the case where focusing is not possible with the precision priority AF, it is not especially necessary to perform this processing. That is, it is also possible to, if focusing is not possible with the precision priority AF, set a predetermined position (for example, a position at which pan focus is realized) as the focusing position and move the focus lens 14f to this position.

As in this embodiment, in the case where focusing cannot be performed with the precision priority AF, it is possible to appropriately perform focusing to perform photographing by performing focusing with the quickness priority AF even in the case of photographing a subject with a low contrast. Furthermore, it is possible to prevent wrong focusing from being caused by flickers and perform photographing giving priority to quickness.

Though, in this embodiment, a predetermined position is set as the focusing position in the case where focusing cannot be performed with the quickness priority AF, it is also possible to perform the precision priority AF to perform focusing as described below.

Figure 8:
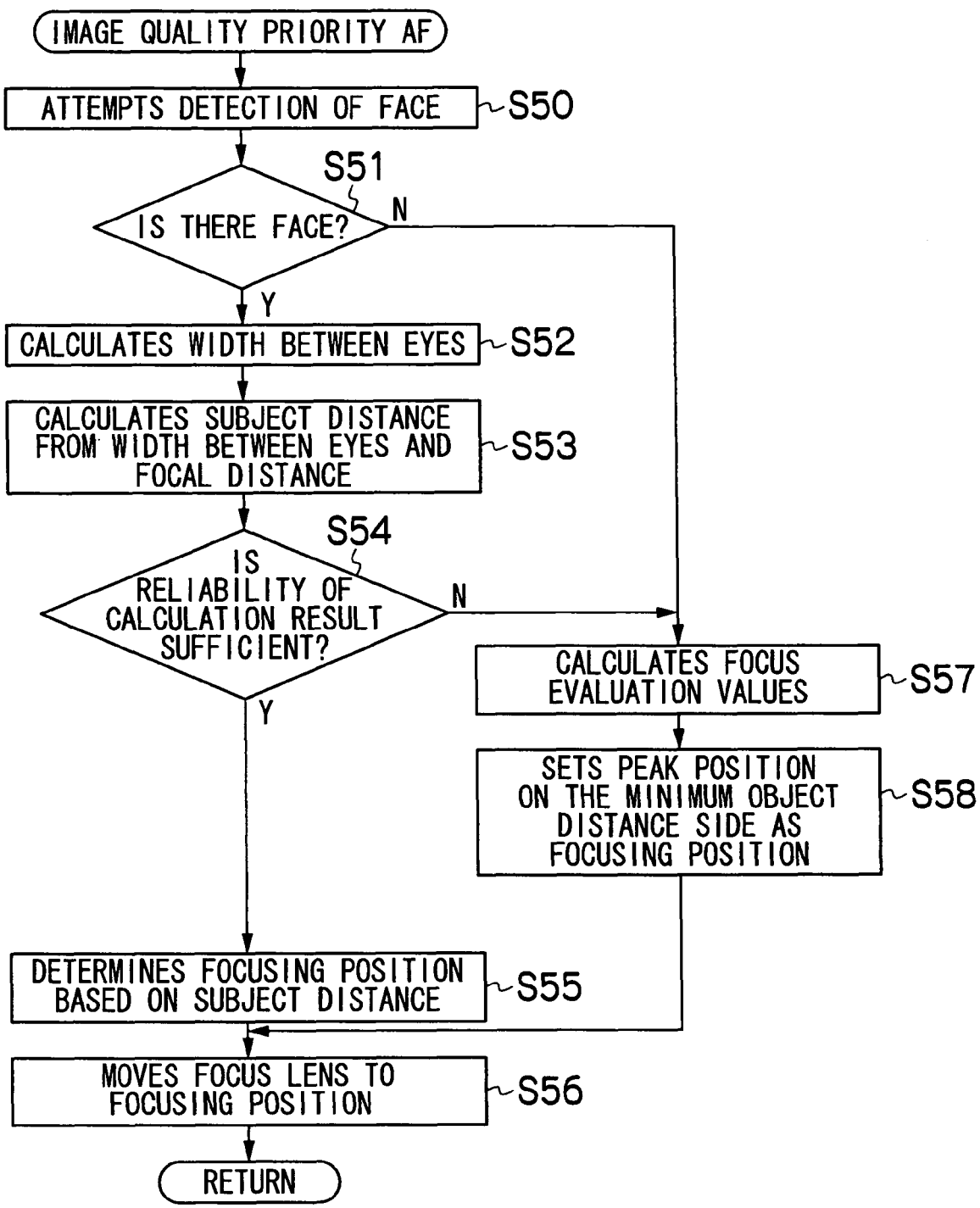
FIG. 8 is a flowchart showing the procedure for performing focusing by performing the precision priority AF when focusing by the quickness priority AF is impossible.

FIG. 8 is a flowchart showing the procedure for performing focusing by performing the precision priority AF when focusing by the quickness priority AF is impossible.

First, detection of the face of a person from image data for AE/AWB is attempted (step S50). Then, based on the result of the detection attempt, whether the face of a person exists or not is determined (step S51).

If it is determined that the face of a person exists as a result of the determination, then the CPU 110 calculates the width between the eyes, of the subject based on position information about the eyes detected by the particular portion detection section 152 (step S52). Then, the subject distance is calculated based on the calculated width between the eyes and the focal distance of the photographing lens 14 (step S53).

After that, the CPU 110 determines the reliability of the calculated subject distance (step S54). If it is determined that the reliability is sufficient, then the focusing position of the focus lens 14*f* is determined based on the calculated subject distance (step S55). Then, the focus motor 120*f* is driven via the focus motor driver 160*f*, and the focus lens 14*f* is moved to the determined focusing position (step S56). Thereby, the photographing lens 14 is focused on the face of the subject.

On the other hand, if it is determined at the above step S51 that there is not a face image, or if it is determined at the above step S54 that the reliability of the calculated subject distance is insufficient, then the CPU 110 performs focusing by the precision priority AF. That is, the CPU 110 moves the focus lens 14*f* from the minimum object distance side to the infinity side within a predetermined search range and sequentially calculates focus evaluation values by the AF detection section 144 (step S57). Then, a peak position on the minimum object distance side is detected based on information about the calculated focus evaluation values, and the position is set as the focusing position (step S58).

After that, the CPU 110 drives the focus motor 120*f* via the focus motor driver 160*f* and moves the focus lens 14*f* to the determined focusing position (step S56). Thereby, the photographing lens 14 is focused on the face of the subject.

As described above, if focusing cannot be performed with the quickness priority AF, the precision priority AF may be performed to perform focusing. Thereby, even when a face is not photographed, it is possible to appropriately perform focusing to perform photographing.

There may be a case where multiple faces are detected when the quickness priority AF is performed. In such a case, for example, the largest one among the photographed faces is detected, and the subject distance is calculated based on the width between the eyes of this face. The face nearest the center of the screen is detected, and the subject distance is calculated based on the width between the eyes of this face. The selection basis may be set by a user.

Though, in this embodiment, the subject distance is calculated based on the width between the eyes of a person when the quickness priority AF is performed, the method for calculating the subject distance from an image is not limited thereto. For example, it is also possible to detect the size of the face (the area, length, width and the like of the whole face) of a person from an image to calculate the subject distance from the detected face size, and it is also possible to detect the eye size (the area, length, width and the like of one eye) from an image to calculate the subject distance from the detected eye size. In addition, it is also possible to calculate the subject distance from the size of the mouth, the size of the nose, the size of the ear, the width between both ears, the size of a hand or the height of a person. It is also possible to calculate the subject distance mixedly using these pieces of information. That is, it is sufficient if the subject distance can be calculated based on the size of a particular portion of a subject in an image.

A subject is not limited to a person, and it may be an animal, a plant or an object. In this case, the subject distance is calculated based on the size of a particular portion (including the entire subject) depending on the subject.

The subject to be targeted by focusing when the quickness priority AF is used may be determined by a user. For example, a configuration is also possible in which a subject targeted by the quickness priority AF, such as a person, an animal (a dog, a cat and the like) and a flower, can be selected by a user (for example, selected from the menu screen), and the subject distance is calculated based on the size of a particular portion of the selected subject. In this case, it is also possible that the portion the size of which is to be detected is selected by the user.

Furthermore, it is also possible that subjects are registered in order of priority. That is, if subjects are registered in the priority order of person, animal and flower, then detection of a subject is performed in the order of person, animal and flower. If the particular portion (for example, the face or the eyes) of a person is not detected, the particular portion of an animal is detected, and the subject distance is calculated based on the size thereof.

Though, in this embodiment, the particular portion of a subject is detected from an image acquired when the release button 24 is fully pressed or half pressed, it is also possible to sequentially detect the particular portion of a subject from through images acquired at the previous stage and calculate the subject distance from the size thereof. Thereby, it is possible to eliminate shutter lag and perform photographing more quickly.

Though, in this embodiment, the quickness priority AF and the precision priority AF are switched by fully pressing and half pressing of the release button 24, the switching may be performed based on the following criteria.

That is, two modes of a quickness priority AF mode and a precision priority AF mode are prepared as the AF modes so that a user can arbitrarily select any of them. If the user selects the quickness priority AF mode, then focusing is performed by the quickness priority AF. If the user selects the precision priority AF, then focusing is performed by the precision priority AF. In this case, a configuration is made, for example, so that AF processing is performed if the release button 24 is half pressed, and actual photographing is performed if the release button 24 is fully pressed, in any of the modes. Alternatively, the release action may be arbitrarily set by a user. That is, it is possible to enable a user to set that the AF processing and then the actual photographing are performed irrespective of full-pressing or half-pressing of the release button 24, in the case of the quickness priority AF mode or that the AF processing and then actual processing are performed only when the release button 24 is fully pressed, for example.

The method for selecting the quickness priority AF mode or the precision priority AF mode is not especially limited. For example, the switching may be performed by a switching button, a lever, a dial or the like provided for the apparatus body 12 or performed on the menu screen.

Furthermore, the quickness priority AF and the precision priority AF may be switched as appropriate according to a photographing condition.

For example, the quickness priority AF and the precision priority AF may be switched according to the focal distance of the photographing lens 14. That is, in the case of a telephoto area, since the depth of field is narrow and the range in which a subject comes into focus is also narrow, the precision priority AF capable of performing high-precision focusing is used. On the other hand, in the case of a wide angle area, since the depth of field is broad and the range in which a subject comes into focus is also broad, the quickness priority AF capable of performing quick focusing is used. Thereby, it is possible to perform focusing processing appropriate for the situation.

As for the criterion for switching, the focal distance at 35 mm film conversion is set, for example, to be 50 mm, and the quickness priority AF is used below 50 mm, and the precision priority AF is used at and above 50 mm. The criterion for switching may be arbitrarily set by a user.

Furthermore, the quickness priority AF and the precision priority AF may be switched according to the recording image quality.

For example, in the case of performing recording an image with a large size, strict focusing is required, and therefore, the precision priority AF capable of performing high-precision focusing is used. On the other hand, in the case of recording an image with a small size such as VGA size, an out-of-focus state to some extent is not so important, and therefore, the quickness priority AF capable of performing quick focusing is used. In this way, by switching AF according to the image size, focusing processing appropriate for the situation can be performed.

Furthermore, for example, in the case of recording an image after compressing it at a low compression rate or in the case of recording an image as RAW data, the precision priority AF capable of performing high-precision focusing is used. On the other hand, in the case of recording an image at a high compression rate, the quickness priority AF capable of performing quick focusing is used. By switching AF according to the compression rate in this way, focusing processing appropriate for the situation can be performed.

It is desirable to appropriately set the image size and the compression rate to be a switching criterion according to the precision of the quickness priority AF and the like, and these may be arbitrarily set by a user.

Furthermore, the quickness priority AF and the precision priority AF may be switched according to the photographing mode. Focusing is to be performed by using the precision priority AF in the "person mode", "scenery mode" and "night view mode" and using the quickness priority AF in the "sports mode".

Furthermore, the quickness priority AF and the precision priority AF may be switched according to a motion picture recording mode or a still image recording mode. That is, the quickness priority AF is used to perform focusing in the case of the mode for recording a motion picture, giving priority to quickness, and the precision priority AF is used to perform focusing in the case of the mode for recording a still image, giving priority to focusing precision. Thereby, focusing processing appropriate for the situation can be performed.

Though the present invention has been described with a so-called digital camera as an example in the above embodiment, the present invention is not limited thereto. The present invention can be applied to all imaging apparatuses provided with a function of focusing a photographing lens, such as a camera-equipped mobile phone and a digital movie apparatus.

What is claimed is:

1. An imaging apparatus for forming an optical image of a subject on a light-receiving surface of an imaging element via a photographing lens; the imaging apparatus comprising:
   a first focusing position setting device which detects a person's face based on an image signal obtained from the imaging element, wherein
      when a face is detected, a subject distance is calculated based on a size of a particular portion of the detected face, and a focusing position of the photographing lens is set in order to focus on the subject positioned at the calculated subject distance, and
      when a face is not detected, a predetermined position is set as the focusing position;
   a second focusing position setting device which detects a person's face based on an image signal obtained from the imaging element, wherein
      when a face is detected, a subject distance is calculated based on a size of a particular portion of the detected face, the photographing lens is moved in a preset search range, focus evaluation values are calculated based on an image signal obtained from imaging element during the moving process of the photographing lens, a position at which the focus evaluation value peaks at a position corresponding to the person's face is detected based on the calculated focus evaluation values and the subject distance, and the detected position is set as the focusing position, and
      when a face is not detected, the photographing lens is moved in a preset search range, focus evaluation values are calculated based on an image signal obtained from imaging element during process of the photographing lens, a position where the focus evaluation value peaks on the minimum object distance side is detected, and the detected position is set as the focusing position;
   a two-stage-stroke-type release button which has half-pressing and full-pressing stages;
   a release button determination device which determines whether the release button has been half pressed or fully pressed directly; and
   a setting device which sets the second focusing position setting device as a focusing position setting device of the photographing lens when the release button is half pressed, and sets the first focusing position setting device as the focusing position setting device of the photographing lens when the release button is fully pressed directly.

2. The imaging apparatus according to claim 1, wherein the first focusing position setting device and the second focusing position setting device extract a person's face based on image signals for through displaying obtained from the imaging element, and calculate the subject distance based on the size of the extracted particular portion of the face.

3. The imaging apparatus according to claim 1, wherein the first focusing position setting device and the second focusing position setting device calculate the subject distance based on a size of a particular portion of the largest face among the photographed faces or the face nearest the center of the screen when multiple faces are detected from an image.

4. An imaging apparatus for forming an optical image of a subject on a light-receiving surface of an imaging element via a photographing lens; the imaging apparatus comprising:
   a first focusing position setting device which detects a person's face based on an image signal obtained from the imaging element, wherein
      when a face is detected, a subject distance is calculated based on a size of a particular portion of the detected face, a reliability of the calculated subject distance is determined, and if the reliability is sufficient a focusing position of the photographing lens is set in order to focus on the subject positioned at the calculated subject distance, and
      when a face is not detected or the reliability is not sufficient, the photographing lens is moved in a preset search range, focus evaluation values are calculated based on an image signal obtained from the imaging element during the moving process of the photographing lens, a position where the focus evaluation value peaks on the minimum object distance side is detected, and the detected position is set as the focusing position,
   a second focusing position setting device which detects a person's face based on an image signal obtained from the imaging element, wherein when a face is detected, subject distance is calculated based on a size of a particular portion of the detected face, the photographing lens is moved in a preset search range, focus evaluation values are calculated based on an image signal obtained from imaging element during the moving process of the photographing lens, a position at which the focus evaluation value peaks at a position corresponding to the person's face is detected based on the calculated focus evaluation values and the subject distance, and the detected position is set as the focusing position, and when a face is not detected, the photographing lens is moved in a preset search range, focus evaluation values are calculated based on an image signal obtained from the imaging element moving process of the photographing lens, a position where the focus evaluation value peaks on the minimum object distance side is detected, and the detected position is set as the focusing position;

a photographing condition detection device which detects a photographing condition; and a setting device which sets one of the first focusing position setting device and the second focusing position setting device as a focusing position setting device of the photographing lens according to the result of the photographing condition detected by the photographing condition detection device.

5. The imaging apparatus according to claim 4, wherein the photographing condition is one of a focal distance of the photographing lens, a recording image quality, and a recording mode of the imaging apparatus, wherein the setting device sets the first focusing position setting device as the focusing position setting device of the photographing lens when the focal distance of the photographing lens is below a specified focal distance set in advance and sets the second focusing position setting device as the focusing position setting device of the photographing lens when the focal distance of the photographing lens is equal to or above the specified focal distance, sets the first focusing position setting device as the focusing position setting device of the photographing lens when the recording image quality is below a specified recording image quality set in advance and sets the second focusing position setting device as the focusing position setting device of the photographing lens when the recording image quality is equal to or above the specified recording image quality, or sets the first focusing position setting device as the focusing position setting device of the photographing lens when the recording mode is a motion picture recording mode and sets the second focusing position setting device as the focusing position setting device of the photographing lens when the recording mode is a still image recording mode.

6. The imaging apparatus according to claim 4, wherein the first focusing position setting device and the second focusing position setting device extract a person's face based on image signals for through displaying obtained from the imaging element, and calculate the subject distance based on the size of the extracted particular portion of the face.

7. The imaging apparatus according to claim 4, wherein the first focusing position setting device and the second focusing position setting device calculate the subject distance based on a size of a particular portion of the largest face among the photographed faces or the face nearest the center of the screen when multiple faces are detected from an image.

8. An imaging apparatus for forming an optical image of a subject on a light-receiving surface of an imaging element via a photographing lens; the imaging apparatus comprising:

a first focusing position setting device which detects a person's face based on an image signal obtained from the imaging element, wherein when a face is detected, a subject distance is calculated based on a size of a particular portion of the detected face, and a focusing position of the photographing lens is set in order to focus on the subject positioned at the calculated subject distance, and when a face is not detected, the photographing lens is moved in a preset search range, focus evaluation values are calculated based on an image signal obtained from imaging element during the moving process of the photographing lens, a position where the focus evaluation value peaks on the minimum object distance side is detected, and the detected position is set as the focusing position;

a second focusing position setting device which detects a person's face based on an image signal obtained from the imaging element, wherein when a face is detected, a subject distance is calculated based on a size of a particular portion of the detected face, the photographing lens is moved in a preset search range, focus evaluation values are calculated based on an image signal obtained from imaging element during the moving process of the photographing lens, a position at which the focus evaluation value peaks at a position corresponding to the person's face is detected based on the calculated focus evaluation values and the subject distance, and the detected position is set as the focusing position, and when a face is not detected, the photographing lens is moved in a preset search range, focus evaluation values are calculated based on an image signal obtained from imaging element during the moving process of the photographing lens, a position where the focus evaluation value peaks on the minimum object distance side is detected, and the detected position is set as the focusing position;

a two-stage-stroke-type release button which has half-pressing and full-pressing stages;

a release button determination device which determines whether the release button has been half pressed or fully pressed directly; and a setting device which sets the second focusing position setting device as a focusing position setting device of the photographing lens when the release button is half pressed, and sets the first focusing position setting device as the focusing position setting device of the photographing lens when the release button is fully pressed directly.

9. The imaging apparatus according to claim 8, wherein the first focusing position setting device and the second focusing position setting device extract a person's face based on image signals for through displaying obtained from the imaging element, and calculate the subject distance based on the size of the extracted particular portion of the face.

10. The imaging apparatus according to claim 8, wherein the first focusing position setting device and the second focusing position setting device calculate the subject distance based on a size of a particular portion of the largest face among the photographed faces or the face nearest the center of the screen when multiple faces are detected from an image.

11. An imaging apparatus for forming an optical image of a subject on a light-receiving surface of an imaging element via a photographing lens; the imaging apparatus comprising:

a first focusing position setting device which detects a person's face based on an image signal obtained from the imaging element, wherein when a face is detected, a subject distance is calculated based on a size of a particular portion of the detected face, a reliability of the calculated subject distance is determined, and if the reliability is sufficient a focusing position of the photographing lens is set in order to focus on the subject positioned at the calculated subject distance, and when a face is not detected or the reliability is not sufficient, the photographing lens is moved in a preset search range, focus evaluation values are calculated based on an image signal obtained from the imaging element during the moving process of the photographing lens, a position where the focus evaluation value peaks on the minimum object distance side is detected, and the detected position is set as the focusing position;

a second focusing position setting device which detects a person's face based on an image signal obtained from the imaging element, wherein when a face is detected, a subject distance is calculated based on a size of a particular portion of the detected face, the photographing lens is moved in a preset search range, focus evaluation values are calculated based on an image signal obtained from imaging element during the moving process of the photographing lens, a position at which the focus evaluation value peaks at a position corresponding to the person's face is detected based on the calculated focus evaluation values and the subject distance, and the detected position is set as the focusing position, and when a face is not detected, the photographing lens is moved in a preset search range, focus evaluation values are calculated based on an image signal obtained from imaging element during the moving process of the photographing lens, a position where the focus evaluation value peaks on the minimum object distance side is detected, and the detected position is set as the focusing position;

a two-stage-stroke-type release button which has half-pressing and full-pressing stages;

a release button determination device which determines whether the release button has been half pressed or fully pressed directly; and a setting device which sets the second focusing position setting device as a focusing position setting device of the photographing lens when the release button is half pressed, and sets the first focusing position setting device as the focusing position setting device of the photographing lens when the release button is fully pressed directly.

12. The imaging apparatus according to claim 8, wherein the first focusing position setting device and the second focusing position setting device extract a person's face based on image signals for through displaying obtained from the imaging element, and calculate the subject distance based on the size of the extracted particular portion of the face.

13. The imaging apparatus according to claim 11, wherein the first focusing position setting device and the second focusing position setting device calculate the subject distance based on a size of a particular portion of the largest face among the photographed faces or the face nearest the center of the screen when multiple faces are detected from an image.

* * * * *